US009512885B2

(12) United States Patent
Huber et al.

(10) Patent No.: US 9,512,885 B2
(45) Date of Patent: Dec. 6, 2016

(54) COUPLING DEVICE, IN PARTICULAR FOR INDUSTRIAL APPLICATIONS

(71) Applicant: Süddeutsche Gelenkscheibenfabrik GmbH & Co. KG, Waldkraiburg (DE)

(72) Inventors: Armin Huber, Schönberg (DE); Marc Brandl, Burgkirchen (DE); Joachim Reihle, Schnaitsee (DE); Johann Löw, Garching (DE); Matthias Schneider, Sankt Wolfgang (DE); Wolfgang Orthofer, Ampfing (DE)

(73) Assignee: SÜDDEUTSCHE GELENKSCHEIBENFABRIK GMBH & CO. KG, Waldkraiburg (DE)

( * ) Notice: Subject to any disclaimer, the term of this patent is extended or adjusted under 35 U.S.C. 154(b) by 0 days.

(21) Appl. No.: 14/374,790

(22) PCT Filed: Dec. 27, 2012

(86) PCT No.: PCT/EP2012/076944
§ 371 (c)(1),
(2) Date: Jul. 25, 2014

(87) PCT Pub. No.: WO2013/110425
PCT Pub. Date: Aug. 1, 2013

(65) Prior Publication Data
US 2015/0038242 A1 Feb. 5, 2015
US 2016/0097427 A2 Apr. 7, 2016

(30) Foreign Application Priority Data

Jan. 26, 2012 (DE) .................. 10 2012 001 450

(51) Int. Cl.
*F16D 3/60* (2006.01)
*F16D 3/62* (2006.01)
*F16D 3/72* (2006.01)

(52) U.S. Cl.
CPC . *F16D 3/60* (2013.01); *F16D 3/62* (2013.01); *F16D 3/72* (2013.01)

(58) Field of Classification Search
CPC ............... F16D 3/60; F16D 3/62; F16D 3/72
USPC ........... 464/62.1, 66.1, 69, 81, 85, 112, 150, 464/152
See application file for complete search history.

(56) References Cited

U.S. PATENT DOCUMENTS

| 1,091,809 A | 3/1914 | Callan |
| 1,466,238 A | 8/1923 | MacDonald |

(Continued)

FOREIGN PATENT DOCUMENTS

| AU | 119364 | * 12/1944 | .................. 464/62.1 |
| DE | 444550 C | 5/1927 | |

(Continued)

OTHER PUBLICATIONS

International Search Report of International Application No. PCT/EP2012/076944 with English translation, dated Mar. 15, 2013.

*Primary Examiner* — Gregory Binda
(74) *Attorney, Agent, or Firm* — Moore & Van Allen PLLC; Henry B. Ward, III (57) ABSTRACT

A coupling device for industrial applications is provided for torque-transmitting connection of two shaft segments. The coupling device comprises a first coupling part for coupling with a first shaft segment and a second coupling part for coupling with a second shaft segment, wherein the first coupling part has a plurality of coupling projections arranged in regular angular intervals around a center axis of the first coupling part. The second coupling part has a corresponding plurality of coupling projections arranged in regular angular intervals around a center axis of the second coupling part, at least two coupling projections of the first and second coupling part adjacent to each other each having a power-transmitting connection by means of an elastic connection arrangement. The elastic connection arrangement has two connecting links angled relative to one another, which extend between the adjacent coupling projections. The connecting links have a power-transmitting coupling to regions facing each other having at least one tension strand portion substantially running in the radial direction.

15 Claims, 6 Drawing Sheets

(56) References Cited

U.S. PATENT DOCUMENTS

| | | | |
|---|---|---|---|
| 1,511,702 A | 10/1924 | Birkholz, Sr. | |
| 2,236,139 A | * 3/1941 | Hutchison, Jr. | ......... F16D 7/027 464/69 X |
| 3,280,242 A | 10/1966 | Brown | |

FOREIGN PATENT DOCUMENTS

| | | | | |
|---|---|---|---|---|
| DE | 1040854 B | | 10/1958 | |
| DE | 19515101 C1 | | 7/1996 | |
| EP | 0167654 A1 | | 1/1986 | |
| GB | 872550 | * | 7/1961 | ..................... 464/69 |

* cited by examiner

COUPLING DEVICE, IN PARTICULAR FOR INDUSTRIAL APPLICATIONS

FIELD OF THE INVENTION

The present invention relates to a coupling device, in particular for industrial applications, for the torque-transmitting connection of two shaft segments.

BACKGROUND OF THE INVENTION

Couplings of this type are known from the prior art. Reference is made to documents EP 0 167 654 A1, DE 195 15 101 C1, and DE 10 40 854 B.

However, in these rotational couplings from the prior art, it has been shown that their load capacity, in particular in the case of industrial applications, is very limited. In addition, these coupling devices known from the prior art offer little opportunity for adapting to various load situations. It is possible only to use different sizes of coupling tabs to allow adaptation to various applications.

Furthermore, these devices known from the prior art have the disadvantage that they provide no protection from spinning in the event of failure. This means that when individual or all coupling tabs break, the coupling is, so to speak, no longer suitable for proper torque transmission, the two shaft segments are no longer connected to one another in a torque-transmitting manner, even by means of a safety mechanism, and instead are completely separated from one another. This may result in major problems, in particular when a high-power industrial drive, for example a high-power large combustion engine, is connected to a shaft segment.

Moreover, conventional industrial couplings exhibit problems in particular when a large axial offset occurs between the two shaft segments to be connected. Specifically in large-scale industrial applications, however, large offset situations or bending angle situations may result in which the two axes of the shaft segments to be connected to one another are offset laterally with respect to one another, or extend at an angle or even askew relative to one another. In such situations, the conventional industrial couplings experience excessive stress and have greatly reduced service lives.

BRIEF SUMMARY OF THE INVENTION

The object of the present invention is to provide a coupling device of the type mentioned at the outset, which avoids the above-mentioned problems from the prior art and provides a better option for adapting to various applications, and which in particular also compensates for axial offset between the shaft segments.

This object is achieved by a coupling device of the type mentioned at the outset, which comprises:
 a first coupling part for coupling to a first shaft segment,
 a second coupling part for coupling to a second shaft segment,
wherein the first coupling part has a plurality of coupling projections arranged at regular angular intervals about a centre axis of the first coupling part,
wherein the second coupling part has a corresponding plurality of coupling projections arranged at regular angular intervals about a centre axis of the second coupling part,
wherein at least two adjacent coupling projections of the first and second coupling parts are each connected in a force-transmitting manner by means of an elastic connection arrangement,
wherein the elastic connection arrangement has two connecting links which are angled relative to one another and which extend between the adjacent coupling projections,
wherein the connecting links at mutually facing areas are coupled in a force-transmitting manner to at least one tension strand portion which extends substantially in the radial direction.

By means of the connection according to the invention of the two adjacent coupling projections of the coupling parts via a connection arrangement which transmits forces, occurring within the scope of torque transmission, in the peripheral direction and also via the tension strand portion which acts in the radial direction, it is possible to compensate for even high radial, axial, or angled offsets of the two shaft segments to be connected. As a result, the bearing load in units which are joined to the two shaft segments to be connected may be kept low. Thus, unlike the situation with conventional approaches, the coupling device according to the invention is designed for a corresponding offset compensation, and does not result in offset-related load situations at the shaft segments and the driving or driven units connected thereto. With regard to the connection arrangement, it is noted that only tensile forces occur in the area of the mutually angled connecting links as well as at the least one tension strand portion, so that the load situation which occurs is controllable, even at high torques. In addition, installation is greatly simplified using the arrangement according to the invention. Known approaches often require that the shaft segments to be connected and the units joined thereto must be brought into an installation position, which does not correspond to their operating position, in order to install the coupling device. This is necessary due to the fact that conventional couplings generally cannot be installed in a tensioned state. In contrast, in the present invention there is no such requirement due to the use of the elastic, optionally flexible connection arrangement which connects the two other coupling parts.

Another advantage of the device according to the invention is that it requires relatively little installation space in the axial direction, based on the torque transmission properties.

One refinement of the invention provides that the connecting links are mounted on the associated coupling projection in an articulated manner, preferably in a rotationally articulated manner. The articulated arrangement, preferably the rotationally articulated mounting of the connecting links on the particular coupling projection, prevents bending stresses in the connecting links and prolongs their service life. The articulated mounting may be implemented, for example, via pins which are fixedly connected to the particular coupling projection, and on which the connecting links are pivotably supported.

One refinement of the invention provides that the connecting links include rigid braces and/or flexible tension elements. The braces may be solid metal rods, for example. Cables, tabs, thread-reinforced arrangements, or the like are suitable flexible tension elements.

One refinement of the invention provides that the connecting links are elastically deformable in their direction of extent between the at least one tension strand portion and the coupling projection. It is thus possible to impart certain damping properties to the coupling, in particular for damping rotary oscillations in the transmission of torque between the shaft segments. In this regard, it may be provided that the connecting links each have at least one tension spring element, preferably at least one thread-reinforced rubber tab. It is thus possible to use tension spring elements, in particular thread-reinforced rubber tabs which have proven effective for transmitting tensile force. These tension spring elements may be used as appropriately dimensioned individual elements, or as standardised components connected in series and/or in parallel.

One refinement of the invention provides that the connecting links at their mutually facing areas are coupled, preferably in an articulated manner, to one another and to the tension strand portion via at least one coupling element. The coupling element may, for example, be a metal body which provides an appropriate articulated attachment of the connecting link, for example via bearing pins or the like. The coupling element may be dimensioned according to the type of connecting link and also the tension strand portion connected thereto. The coupling element may have a polygonal design, for example, in the form of a flat triangular body. The coupling element may have provisions for supporting connecting links and/or one end of the tension strand portion, solely on one plane surface or also on two mutually opposite plane surfaces.

One refinement of the invention provides that the tension strand portion is elastically deformable in its substantially radial direction of extent. It is possible for the tension strand portion in each case to have at least one tension spring element, preferably at least one thread-reinforced rubber tab. It may preferably be provided that the tension strand portion has a plurality of rubber tabs mechanically arranged in series and/or in parallel.

One advantageous embodiment results, for example, when two mutually associated connecting links and the associated tension strand portion, observed starting from the coupling centre, are arranged in a Y configuration. This has the advantage that during the transmission of torque, the two connecting links are not subjected to full tension in the peripheral, i.e., tangential, direction, and instead, the connecting links with incorporation of the tension strand portion may optionally even have a completely rigid design, and the tension strand portion may have sufficiently large dimensions, in a space-saving manner, to transmit even high torques.

One refinement of the invention provides at least one intermediate coupling part which is situated between the first and the second coupling part and which has a central axis of rotation, the connecting links at mutually facing areas being coupled to the intermediate coupling part in a force-transmitting manner via the at least one tension strand portion which extends in the radial direction.

The use of an intermediate coupling part with a corresponding connection arrangement allows compensation for offset situations between the two shaft segments over a wide range. In principle, however, it is also possible to manage completely without an intermediate coupling part by connecting the tension strand portions to one another continuously, so to speak. It is thus possible, in a manner of speaking, to connect two Y configurations to one another at their "foot points" and to provide them in a continuous manner. When multiple appropriate connection arrangements are used, these may also be situated in different planes. However, the use of an intermediate coupling part is an advantageous embodiment which allows a central connection of the individual connection arrangements. The intermediate coupling part may have a solid or flexible design, for example solely in the form of a cable or an annular body which centrally connects the connection arrangements, in particular their tension strand portions, to one another.

With regard to the intermediate coupling part, it is possible for the intermediate coupling part to be situated radially inside or radially outside the connecting links. Thus, as a central body, for example, the intermediate coupling part may be situated in the centre of the coupling device according to the invention, between the two coupling parts. Alternatively, however, it is possible to design the intermediate coupling part as a ring which, viewed in the axial direction, extends radially outside the coupling arms, so to speak. The elastic connection arrangement composed of at least one pair of connecting links and the tension strand portion coupled thereto may thus face radially inwardly or radially outwardly.

It may also be provided that the at least one tension strand portion is situated on the intermediate coupling part in an articulated manner. In this way it is also possible to prevent the tension strand portion from undesirably being subjected to bending or deflection stresses during operation. The articulated mounting has advantages in particular for compensating for axial offset situations.

For the greatest possible reduction of tension in such axial offset situations, it is also advantageously provided according to the invention that the intermediate coupling part is freely movable relative to the first and second coupling parts. The intermediate coupling part is thus able to move into a preferably neutral position and compensate for the angled, radial, or axial offset by assuming such a neutral position. The intermediate coupling part, in a manner of speaking, is "tensioned" or held in the neutral position via the particular connection arrangements having connecting links and tension strand portions. It should be noted, however, that the state of stress in the coupling device according to the invention may be easily reduced or even completely eliminated by twisting the two coupling parts relative to one another, thus greatly reducing the tension in the at least one connection arrangement. The remaining tension may possibly be caused solely by the weight of the intermediate coupling part and of the connection arrangement, and is therefore negligible. This results in simple assembly and disassembly.

Another embodiment variant of the invention provides that at least one of the first and the second coupling parts includes a first coupling body having multiple coupling arms originating from a central section in the radial direction, and a second coupling body having multiple coupling arms originating from a central section in the radial direction. In this embodiment variant, the coupling body may be provided with two, three, four, five, or more coupling arms in a star shape, for example. In the event of overload or failure, the coupling arms may contact one another directly, thus forming anti-slip protection.

One refinement of the invention provides that the first coupling part and the second coupling part in the neutral state are angularly offset with respect to one another in such a way that the coupling arms of the first coupling part and the coupling arms of the second coupling part are alternatingly situated in succession at regular angular intervals. The two coupling parts engage with one another in an interlocking manner, for example.

With regard to the coupling parts, it may be provided that the first and/or the second coupling part has/have a connecting section for a shaft segment, from which the coupling projections extend on a truncated cone surface. This results in a structure which is compact, and at the same time stable with respect to force transmission. In addition, this arrangement allows the intermediate coupling part to be situated within the free space in the truncated cone described by the coupling projections. In this way, the coupling device according to the invention may have a compact design not only in the axial direction, but also in the radial direction.

For further stabilisation, according to the invention it may be provided that the adjacent coupling projections of a coupling part are connected to one another in a reinforced manner by means of cross braces.

BRIEF DESCRIPTION OF THE SEVERAL VIEWS OF THE DRAWINGS

The invention is explained below by way of example with reference to the appended figures, which show the following.

DETAILED DESCRIPTION OF THE INVENTION

Figure 1:
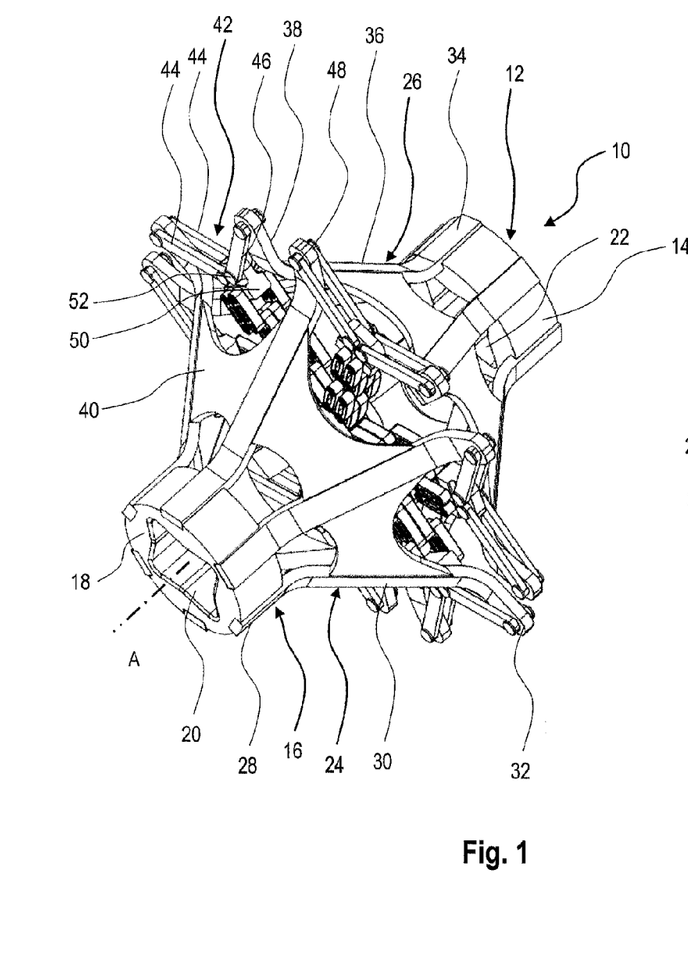
FIG. 1 shows a three-dimensional illustration of a coupling device according to the invention, according to a first embodiment of the invention.

FIG. 1 shows a coupling device according to the invention in a three-dimensional illustration, denoted overall by reference numeral 10. The coupling device includes a first coupling part 12 for coupling to a first shaft segment which is provided above a pot-shaped section 14. The coupling device 10 also has a second coupling part 16 which has an essentially identical design to the first coupling part 12 and which similarly has a pot-shaped section 18. It is apparent that in the pot-shaped section, star-shaped inner profiles 20 and 22 are provided, into which a correspondingly profiled shaft segment is insertable in its axial direction A, with or without play, for transmitting torque.

Figure 2:
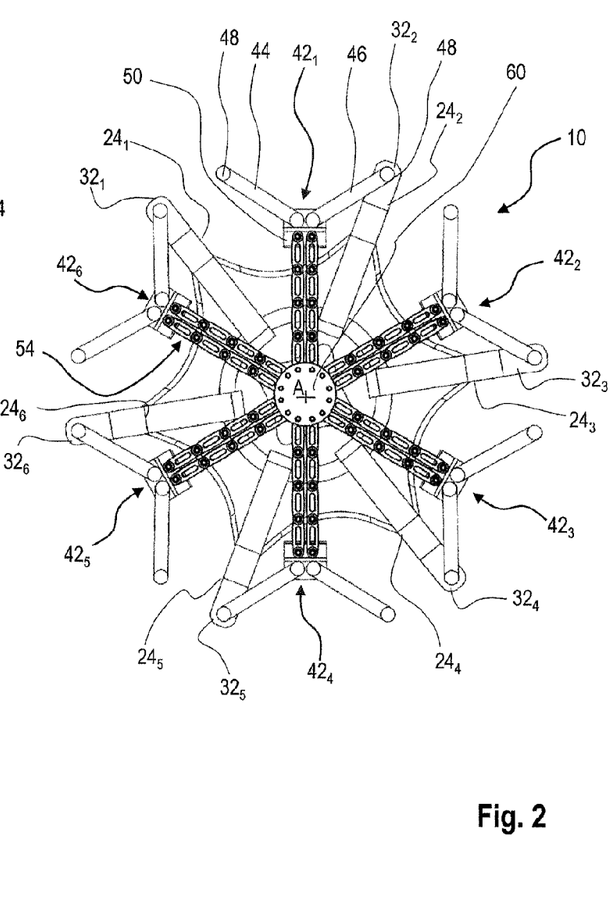
FIG. 2 shows an interior view of the coupling device according to FIG. 1.
Figure 3:
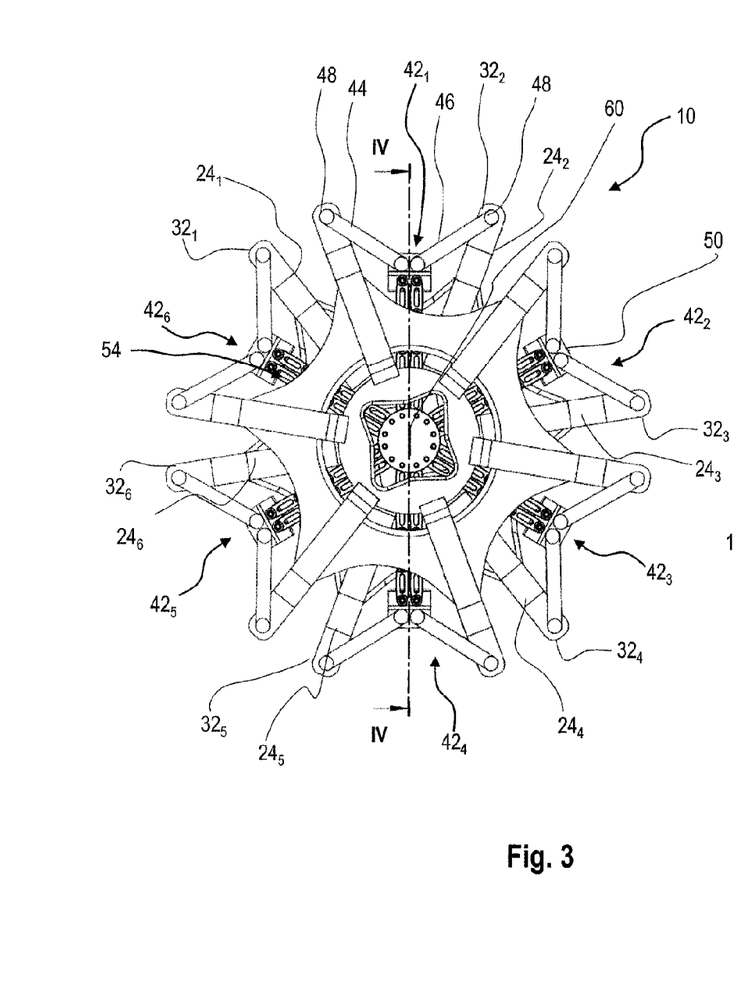
FIG. 3 shows a front view of the coupling device according to FIGS. 1 and 2.
Figure 4:
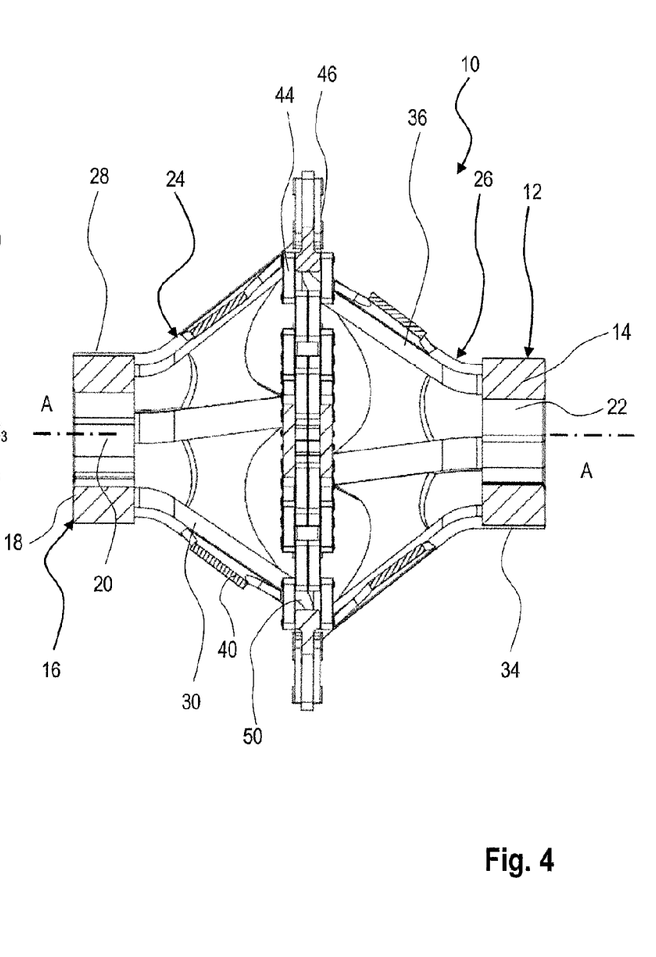
FIG. 4 shows an axis-containing sectional view corresponding to the section line IV-IV from FIG. 3.

In the following discussion, reference is also made to the various views of this first coupling device according to FIGS. 2 through 4. The two coupling parts 12 and 16 have arm-like coupling projections 26 and 24, respectively. More precisely, each coupling part has six arm-like coupling projections, which in FIG. 2 are generally denoted by reference numerals $24_1$ through $24_6$. A corresponding number of coupling projections 26 are provided in the coupling part 12. It is also apparent that the individual coupling projections, starting from the pot 18, where they have a section 28 which extends essentially in the axial direction, extend in a transition section 30 substantially along a truncated cone surface. Starting from the transition section 30, the coupling projections 24 are angled, and form a radial section 32. All coupling projections $24_1$ through $24_6$ lie, so to speak, in a shared plane which extends substantially axially orthogonally. The same applies for the coupling projections 26, which likewise have an axially extending section 34, a section 36 which extends along a truncated cone surface, and a radial section 38. It is noted that the radial sections $32_1$ through $32_6$ together with the corresponding radial sections 38 of the other coupling part 12, in a starting state, lie in a shared plane which extends substantially axially orthogonally, as is apparent in FIGS. 1 and 4, for example. In the operating state, however, this is expected in only rare cases, at best. The coupling 10, as will be described in greater detail below, is designed specifically for compensating for large axial offset situations in which two shaft segments which are connected to the coupling parts 12 and 16 have a large parallel offset, axial offset, radial offset, or angled offset, or are even highly skewed with respect to one another.

It is also apparent in FIG. 1 that for stabilising the arrangement, the individual coupling projections 24 and 26 are joined together in pairs via connecting elements 40. Each coupling part is reinforced in this way.

The two coupling parts are connected to one another via connection arrangements 42. More precisely, once again six connection arrangements are provided, as shown in FIG. 2 and denoted there by reference numerals $42_1$ through $42_6$. The connection arrangements 42 have two connecting links 44, 46 which are angled relative to one another. The connection arrangements are each situated on a coupling projection 24 or 26 in an articulated manner via connecting pins 48. It is apparent in FIGS. 2 and 4 that two connecting links 44 and 46 situated in parallel are actually provided for each connection arrangement 42. At their mutually facing ends the connecting links are connected via a solid coupling element 50. Joint pins 52 are also used for this purpose. The joint pins 48 and 52 pass through the connecting links, and are mounted in openings in the radial sections 32 and 38 of the coupling projections 24 and 26, respectively.

A similar connection is present at the coupling elements 50. Chains composed of connecting tabs, denoted overall by reference numeral 54, extend radially within the coupling elements 50. In the embodiment shown, these chains 54 composed of connecting tabs include four connecting tabs in each case. A total of four such chains 54 are provided, two adjacent to one another and two following one another in succession, as is apparent in FIG. 1. These chains, composed of connecting tabs, form radially extending tension strand portions, which at one end are attached to the coupling element 50 in an articulated manner, and at the other end are attached, likewise in an articulated manner, to a disk-shaped intermediate coupling part 60.

Thus, each connection arrangement 42 includes two pairs of connecting links 44 and 46, a coupling element 50, and a radial tension strand portion composed of corresponding tab chains 54, which form a Y configuration and thus join together adjacent coupling arms 26 and 24 of the two coupling parts 12 and 18, respectively, with incorporation of the intermediate coupling part 60. The shown Y configuration of each connection arrangement has advantages, as described below.

Conventional coupling tabs which are available as standard components are used for the tension strand portions 54. The coupling tabs are designed as rubber tabs having fastening eyes, whereby thread inlays which encircle the fastening eyes are embedded in the rubber material. It is generally known that these types of tension tabs have an exceptionally long service life with very good tensile force transmission properties, and are also resistant in harsh environments with thermal stress and exposure to aggressive media. Such tabs are used, for example, in this or a similar form in various industrial applications, as well as in the motor vehicle and utility vehicle sectors.

For installation, the two coupling parts 12 and 16 are attached via their inner profiles 20 and 22, respectively, to corresponding shaft segments (not shown) which are provided at the end, for example, with a square profile which may be accommodated in the inner profiles 20, 22 with a certain amount of play. The two coupling parts may be positioned with respect to one another in such a way that the connection arrangements are free of tension. The connection arrangements may also optionally be detached on one side or on both sides of the coupling parts 12, 16.

In an operating situation in which, for example, a shaft segment which is coupled to the coupling part 12 is coupled to a drive unit, and the shaft segment which is coupled to the coupling part 16 is to be driven, a torque is transmitted to the connecting arms 24 via the coupling arms 26, the connection arrangements 42, and the intermediate coupling part 60, and ultimately to the shaft segment which is connected to the coupling part 16. Only the connecting links 44, 46 are subjected to tension during this transmission. However, in the present exemplary embodiment the connecting links have a rigid design. Elasticity of the coupling is achieved due to the tensile load on the tension strand portions 54.

Due to the fact that the intermediate coupling part 60 is freely situated between the two coupling parts 12 and 16 and is braced solely between the individual connecting strands 54, the intermediate coupling part may be freely positioned. On account of the articulated attachment of the individual connecting links 44, 46 and the inherent flexibility of the tension strand portion due to its design as a chain of multiple coupling tabs, large offset situations between the connected shaft segments may also be compensated for, the intermediate coupling part 60 always moving into a situation which ensures compensation under the lowest possible tension.

Unlike the situation in conventional couplings, in which the coupling arms are connected by connection arrangements which extend tangentially, i.e., in the peripheral direction, the arrangement according to the invention has particular advantages due to the fact that its elastic damping behaviour is achieved solely via relative movements of the two connecting link pairs 44, 46 and a pure tensile load on the tension strand portions 54. The forces acting on the individual components may thus be significantly reduced compared to conventional arrangements. However, a major advantage also lies in the possibility for compensating for replacement situations. Overall, a long service life may be attained using this coupling device, although the individual components do not have to have an exceptionally solid design.

By simply twisting the two coupling parts relative to one another into a largely tension-free state, the assembly and disassembly is also significantly simplified, so that individual tabs or entire connection arrangements (Y arrangements) may be replaced with little effort. The main portion of the elasticity of the coupling is achieved solely by the substantially radially extending tension strand portions. Such a configuration of the coupling device according to the invention also allows simple adaptation of the coupling to the particular application. If large torques are transmitted, the tension strand portions 54 may have a correspondingly resistant design, for example by attaching additional chains or using stronger tabs. If only small torques have to be transmitted, the overall coupling may be dimensioned to be smaller, or also only adapted by providing the tension strand portions with a correspondingly weaker design, for example by using a small number of tension tab chains. This has the advantage that the overall coupling may be composed of standard components, and, depending on the application (load situation), a corresponding appropriate design of the tension strand portions is provided, taking necessary mechanical safety into account.

Figure 5:
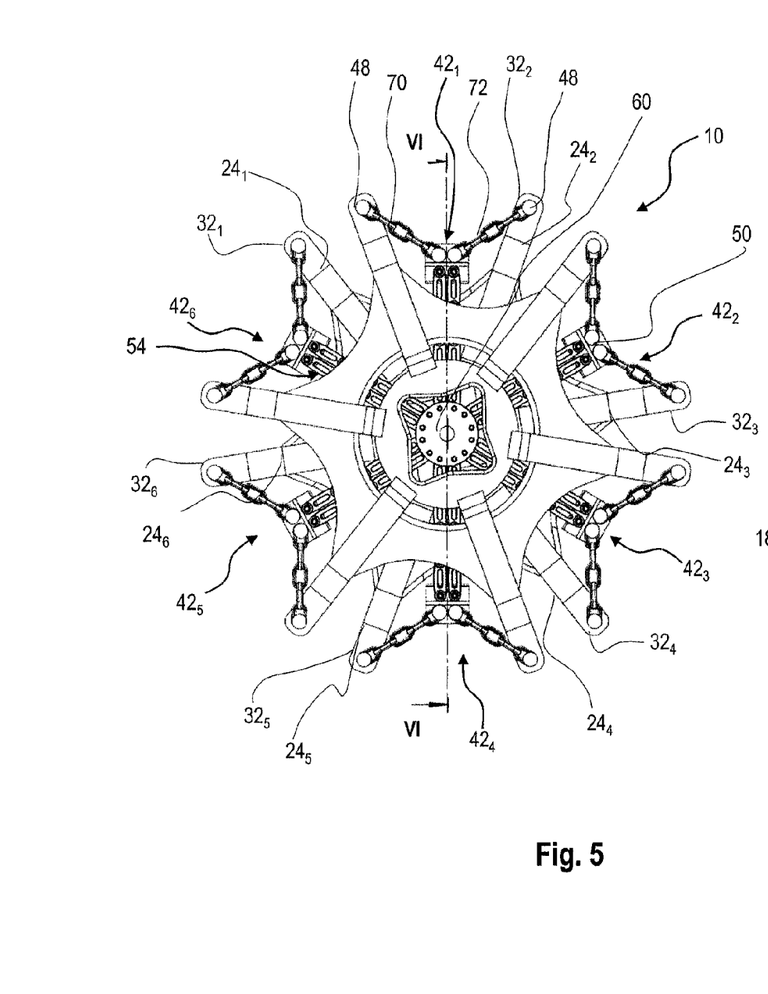
FIG. 5 shows a front view of a second embodiment of the coupling device according to the invention.
Figure 6:
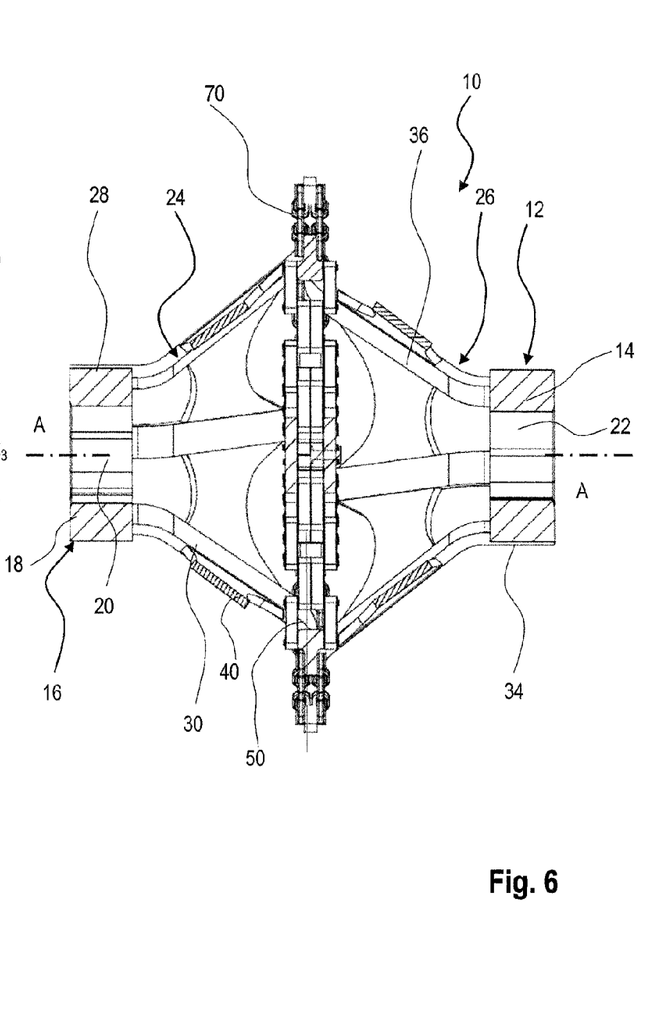
FIG. 6 shows an axis-containing sectional view along the section line VI-VI from FIG. 5.

FIGS. 5 and 6 show a modification of the embodiment according to the invention; in the following discussion, only the differences from the first embodiment according to FIGS. 1 through 4 are addressed. To avoid repetition and to simplify the description, the same reference numerals as above are used for identical components.

Figure 7:
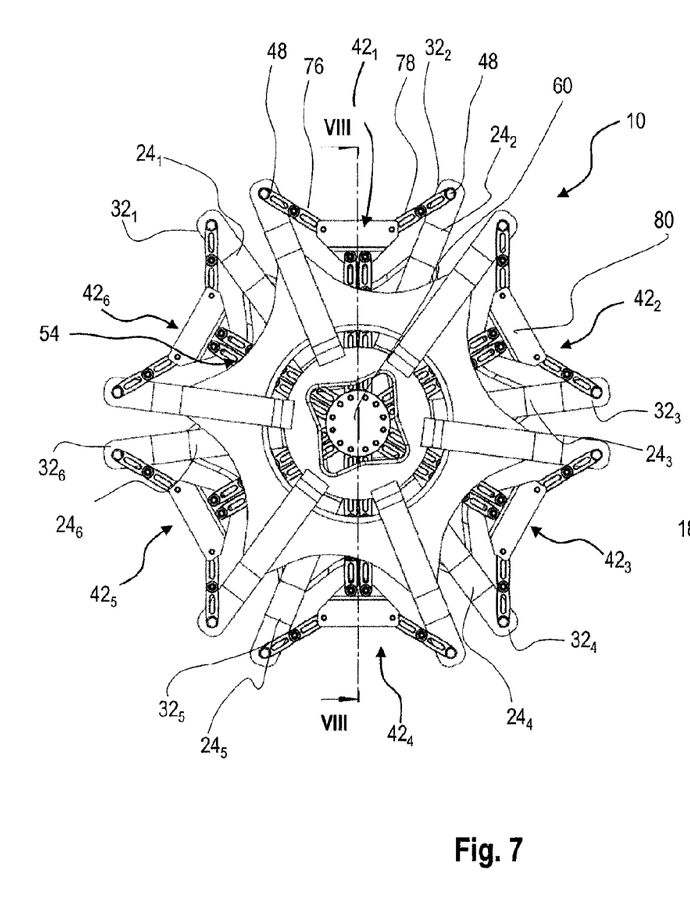
FIG. 7 shows a front view of a third embodiment of the coupling device according to the invention.
Figure 8:
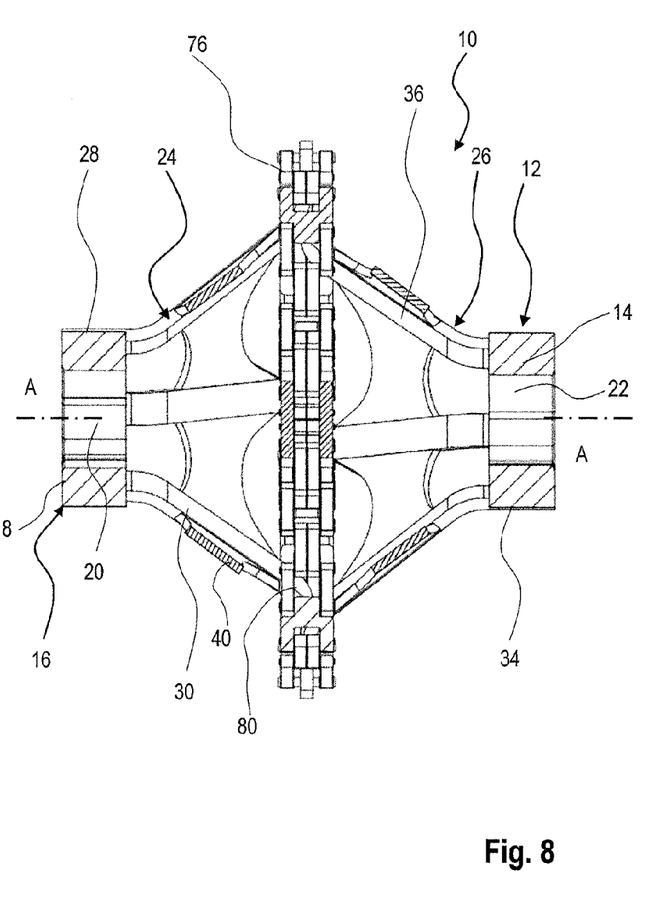
FIG. 8 shows an axis-containing sectional view along the section line VIII-VIII from FIG. 7.

The embodiment according to FIGS. 5 and 6 differs from the embodiment according to FIGS. 1 through 4 solely in that the rigid connecting braces 44 and 46 from FIGS. 1 through 4 have been replaced by chain sections 70 and 72. The chain sections themselves are formed from steel members, and are substantially rigid; i.e., they have little inherent elasticity compared to the elasticity of the radially extending tension strand portions 54. However, their flexibility as a chain distinguishes them from the embodiment according to FIGS. 1 through 4, which offers advantages in assembly and disassembly. Of course, the chain sections 70, 72 have sufficient load capacity to withstand the forces which occur in the event of torque transmission, The embodiment variant according to FIGS. 7 and 8 is similar to the embodiment variant according to FIGS. 5 and 6. However, the chain sections 70, 72 in the latter-referenced figures, made of steel members, are replaced by chains made of rubber tabs, the same as for the tension strand portions 54, which likewise have an elastic design in the tensile direction. These chains are denoted by reference numerals 76, 78. As is apparent in FIG. 8, these chains 76, 78 are also arranged in pairs.

Another difference from the preceding embodiments lies in the configuration of the coupling element. Instead of the coupling element which has a rectangular design in the front view in FIG. 5, a substantially triangular coupling element 80 is apparent in FIG. 7 which correspondingly accommodates the chain sections 76 and 78 and the tension strand portion 54.

Otherwise, similar components having the same function are once again denoted by the same reference numerals as above, and are not described in greater detail.

Figure 9:
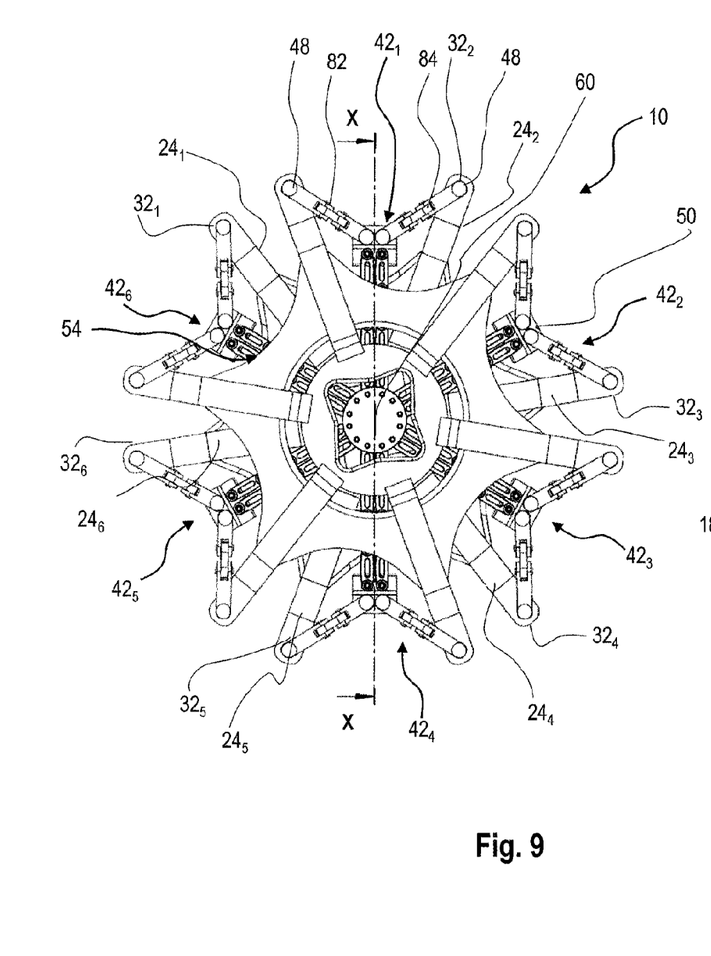
FIG. 9 shows a front view of a fourth embodiment of the invention.
Figure 10:
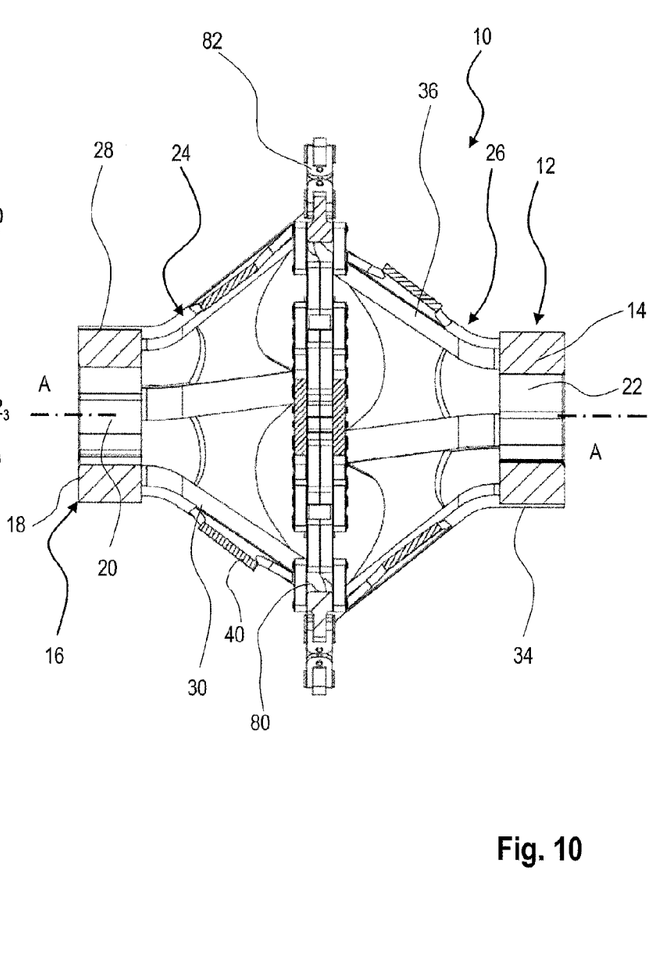
FIG. 10 shows an axis-containing sectional view of the device according to the invention from FIG. 9 along the section line X-X.

The embodiment according to FIGS. 9 and 10 is also similar to the embodiment according to FIGS. 5 and 6, whereby mountable chain sections 82, 84 having a solid design are used, as is the case in the embodiment according to FIGS. 5 and 6.

Otherwise, similar components having the same function are once again denoted by the same reference numerals as above, and are not described in greater detail.

Figure 11:
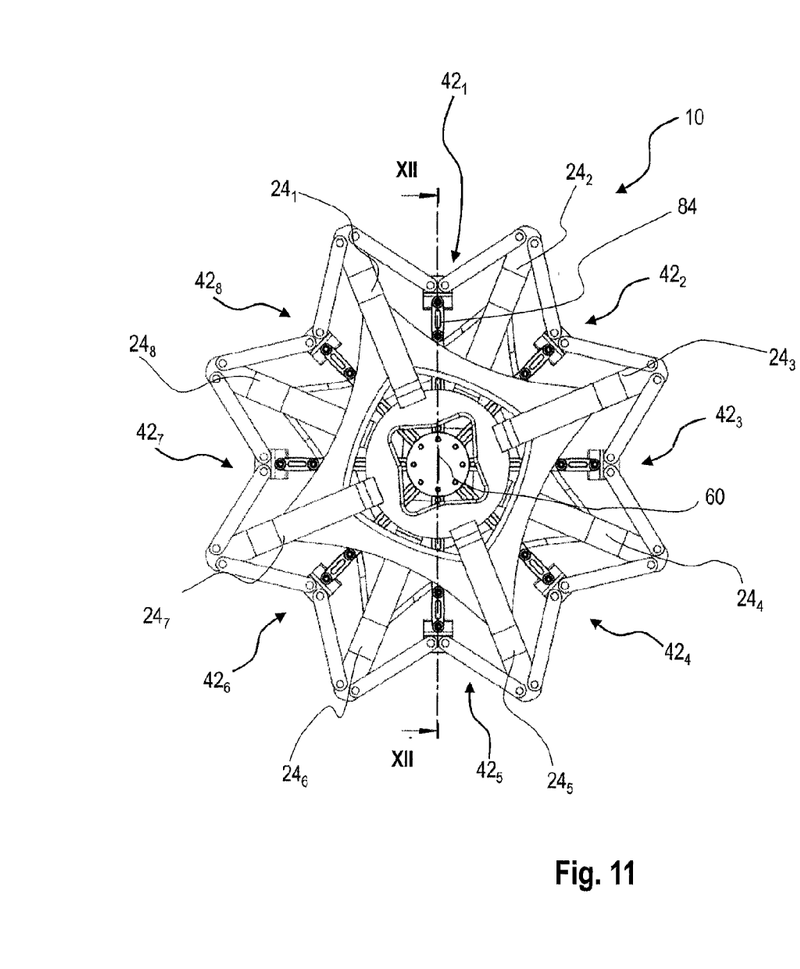
FIG. 11 shows a front view of a fifth embodiment of the invention.
Figure 12:
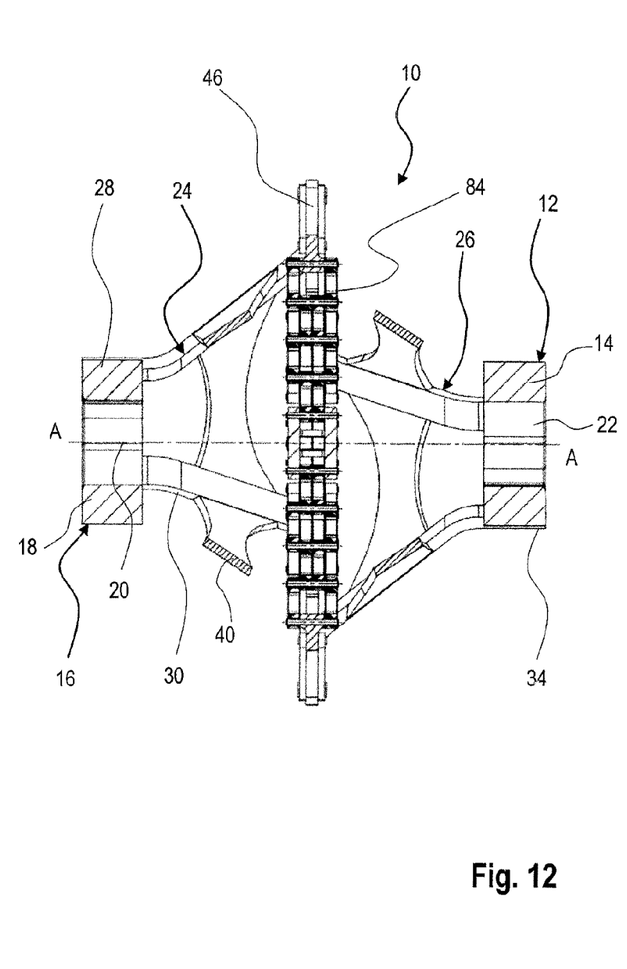
FIG. 12 shows an axis-containing sectional view of the coupling device according to FIG. 11 along the section line XII-XII.

Lastly, the embodiment according to FIGS. 11 and 12 shows an arrangement similar to the first embodiment according to FIGS. 1 through 4, but with a slightly less strong design. It is apparent that in the present embodiment, the tension strand portion 84 is formed solely by two parallel chain sections, composed of tension tabs, situated between the coupling elements 50 and the intermediate coupling element 60. Another difference of this coupling compared to the couplings described above is that only four arm-like coupling projections $24_1$ through $24_4$ and $26_1$ through $26_4$ are provided. However, all coupling arms are coupled on both sides in a torque-transmitting manner via connection arrangements $42_1$ through $42_8$ so that torque transmission may take place in two directions. This makes it possible to drive the two shaft segments, which are coupled to one another via the coupling device according to FIG. 11, in alternation in two rotational directions.

The above-described embodiments according to FIG. 1 through 10 do not allow this, or allow it only to a limited extent.

Otherwise, similar components having the same function are once again denoted by the same reference numerals as above, and are not described in greater detail.

Based on the preceding description, it is apparent that the coupling device according to the invention may be designed in numerous configurations. The essential factor here is the arrangement of an intermediate coupling part 60 between the two coupling parts 12 and 16 and the corresponding torque-transmitting connection of the two coupling parts via the intermediate coupling part, using the respective connection arrangements 42. The elasticity for compensating for rotary oscillations results in particular from the elasticity of the radially extending tension strand portions. The flexibility with regard to an offset compensation results from the decoupled arrangement of the two coupling parts and the substantially free movability of the intermediate coupling part by means of the connection arrangements. The Y configuration of the connection arrangements allows a corresponding tensile load on the tension strand portion 54.

In principle, however, it is also possible for all parts of the connection arrangements to have a solid design, i.e., a nonelastic design, to allow a corresponding offset compensation, but for the damping properties to be provided to a lesser degree or even eliminated entirely.

The invention claimed is:

1. Coupling device, in particular for industrial applications, for the torque-transmitting connection of two shaft segments, comprising:
a first coupling part for coupling to a first shaft segment,
a second coupling part for coupling to a second shaft segment,
wherein the first coupling part has a plurality of coupling projections arranged at regular angular intervals about a centre axis of the first coupling part,
wherein the second coupling part has a corresponding plurality of coupling projections arranged at regular angular intervals about a centre axis of the second coupling part,
wherein at least two adjacent coupling projections of the first and second coupling parts are each connected in a force-transmitting manner by means of an elastic connection arrangement,
wherein the elastic connection arrangement has two connecting links which are angled relative to one another and which extend between the adjacent coupling projections, wherein the connecting links at mutually facing areas are coupled in a force-transmitting manner to at least one tension strand portion which extends substantially in the radial direction, and
where the coupling device further comprises an intermediate coupling part which is situated between the first and the second coupling part and which has a central axis of rotation, the connecting links at mutually facing areas being coupled to the intermediate coupling part in a force-transmitting manner via the at least one tension strand portion which extends in the radial direction, wherein the intermediate coupling part is freely movable relative to the first and second coupling parts, wherein the tension strand portion is elastically deformable in its substantially radial direction of extent, wherein the tension strand portion has a plurality of rubber tabs mechanically arranged in series and/or in parallel.

2. Coupling device according to claim 1, wherein the connecting links are mounted on the associated coupling projection in an articulated manner.

3. Coupling device according to claim 1, wherein the connecting links include rigid braces and/or flexible tension elements.

4. Coupling device according to claim 1, wherein the connecting links are elastically deformable in their direction of extent between the tension strand portion and the coupling projection.

5. Coupling device according to claim 4, wherein the connecting links each have at least one tension spring element comprising at least one thread-reinforced rubber tab.

6. Coupling device according to claim 1, wherein the connecting links at their mutually facing areas are coupled to one another and to the tension strand portion via at least one coupling element.

7. Coupling device according to claim 1, wherein two mutually associated connecting links and the associated tension strand portion are arranged in a Y configuration.

8. Coupling device according to claim 1, wherein the intermediate coupling part is situated radially inside the connecting links.

9. Coupling device according to claim 1, wherein the at least one tension strand portion is situated on the intermediate coupling part in an articulated manner.

10. Coupling device according to claim 1, wherein at least one of the first and the second coupling parts includes a first coupling body having multiple coupling arms originating from a central section in the radial direction, and a second coupling body having multiple coupling arms originating from a central section in the radial direction.

11. Coupling device according to claim 10, wherein the first coupling part and the second coupling part in the neutral state are angularly offset with respect to one another in such a way that the coupling arms of the first coupling part and the coupling arms of the second coupling part are alternatingly situated in succession at regular angular intervals.

12. Coupling device according to claim 1, wherein the first and/or the second coupling part has/have a connecting section for a shaft segment, from which the coupling projections extend on a truncated cone surface.

13. Coupling device according to claim 1, wherein the adjacent coupling projections of a coupling part are connected to one another in a reinforced manner by means of cross braces.

14. Coupling device, in particular for industrial applications, for the torque-transmitting connection of two shaft segments, comprising:
a first coupling part for coupling to a first shaft segment,
a second coupling part for coupling to a second shaft segment,
wherein the first coupling part has a plurality of coupling projections arranged at regular angular intervals about a centre axis of the first coupling part,
wherein the second coupling part has a corresponding plurality of coupling projections arranged at regular angular intervals about a centre axis of the second coupling part, wherein at least two adjacent coupling projections of the first and second coupling parts are each connected in a force-transmitting manner by means of an elastic connection arrangement, wherein the elastic connection arrangement has two connecting links which are angled relative to one another and which extend between the adjacent coupling projections, wherein the connecting links at mutually facing areas are coupled in a force-transmitting manner to at least one tension strand portion which extends substantially in the radial direction, wherein the coupling device further comprises an intermediate coupling part which is situated between the first and the second coupling part and which has a central axis of rotation, the connecting links at mutually facing areas being coupled to the intermediate coupling part in a force-transmitting manner via the at least one tension strand portion which extends in the radial direction, wherein the intermediate coupling part is freely movable relative to the first and second coupling parts, wherein the tension strand portion is elastically deformable in its substantially radial direction of extent, wherein the tension strand portion in each case has at least one thread-reinforced rubber tab.

15. Coupling device, in particular for industrial applications, for the torque-transmitting connection of two shaft segments, comprising:

a first coupling part for coupling to a first shaft segment,
a second coupling part for coupling to a second shaft segment, wherein the first coupling part has a plurality of coupling projections arranged at regular angular intervals about a centre axis of the first coupling part, wherein the second coupling part has a corresponding plurality of coupling projections arranged at regular angular intervals about a centre axis of the second coupling part, wherein at least two adjacent coupling projections of the first and second coupling parts are each connected in a force-transmitting manner by means of an elastic connection arrangement, wherein the elastic connection arrangement has two connecting links which are angled relative to one another and which extend between the adjacent coupling projections, wherein the connecting links at mutually facing areas are coupled in a force-transmitting manner to at least one tension strand portion which extends substantially in the radial direction, wherein the coupling device further comprises an intermediate coupling part which is situated between the first and the second coupling part and which has a central axis of rotation, the connecting links at mutually facing areas being coupled to the intermediate coupling part in a force-transmitting manner via the at least one tension strand portion which extends in the radial direction, wherein the intermediate coupling part is freely movable relative to the first and second coupling parts, wherein the at least one tension strand portion is situated on the intermediate coupling part in an articulated manner.

* * * * *

UNITED STATES PATENT AND TRADEMARK OFFICE
CERTIFICATE OF CORRECTION

PATENT NO. : 9,512,885 B2  
APPLICATION NO. : 14/374790  
DATED : December 6, 2016  
INVENTOR(S) : Armin Huber et al.

It is certified that error appears in the above-identified patent and that said Letters Patent is hereby corrected as shown below:

On the Title Page

City of residence of Inventor, Johann Löw, should be "Peterskirchen (DE)", not "Garching (DE)".
City of residence of Inventor, Matthias Schneider, should be "Haag (DE)", not "Sankt Wolfgang (DE)".

Signed and Sealed this
Twenty-first Day of February, 2017

Michelle K. Lee
*Director of the United States Patent and Trademark Office*